United States Patent
Jourdain et al.

(10) Patent No.: US 10,815,325 B2
(45) Date of Patent: *Oct. 27, 2020

(54) HIGH MOLECULAR WEIGHT MULTIMODAL ELASTOMER COMPOSITIONS WITH GOOD PROCESSABILITY

(71) Applicant: ExxonMobil Chemical Patents Inc., Baytown, TX (US)

(72) Inventors: Eric P. Jourdain, Rhode Saint Genese (BE); Clement Arinal, Le Havre (FR); Hans D. Jachowski, Pulheim (DE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 127 days.

This patent is subject to a terminal disclaimer.

(21) Appl. No.: 15/781,486

(22) PCT Filed: Dec. 15, 2016

(86) PCT No.: PCT/US2016/066803
§ 371 (c)(1),
(2) Date: Jun. 5, 2018

(87) PCT Pub. No.: WO2017/127184
PCT Pub. Date: Jul. 27, 2017

(65) Prior Publication Data
US 2018/0355084 A1    Dec. 13, 2018

Related U.S. Application Data

(60) Provisional application No. 62/280,357, filed on Jan. 19, 2016, provisional application No. 62/412,514, filed on Oct. 25, 2016.

(51) Int. Cl.
| | | |
|---|---|---|
| C08L 23/16 | (2006.01) |
| C08F 210/00 | (2006.01) |
| C08F 210/18 | (2006.01) |
| C08K 3/04 | (2006.01) |
| C08K 3/06 | (2006.01) |
| C08K 5/09 | (2006.01) |
| C08K 5/39 | (2006.01) |
| C08K 5/46 | (2006.01) |
| C08K 5/5398 | (2006.01) |
| C08L 91/00 | (2006.01) |
| C08K 5/00 | (2006.01) |
| B01J 27/10 | (2006.01) |
| B01J 31/14 | (2006.01) |
| C08F 2/00 | (2006.01) |
| C08F 6/10 | (2006.01) |
| C08F 4/20 | (2006.01) |
| C08F 4/52 | (2006.01) |
| C08K 3/22 | (2006.01) |

(52) U.S. Cl.
CPC .............. *C08F 210/18* (2013.01); *B01J 27/10* (2013.01); *B01J 31/143* (2013.01); *C08F 2/001* (2013.01); *C08F 4/20* (2013.01); *C08F 4/52* (2013.01); *C08F 6/10* (2013.01); *C08K 3/04* (2013.01); *C08K 3/06* (2013.01); *C08K 3/22* (2013.01); *C08K 5/0091* (2013.01); *C08K 5/09* (2013.01); *C08K 5/39* (2013.01); *C08K 5/46* (2013.01); *C08K 5/5398* (2013.01); *C08L 23/16* (2013.01); *C08L 91/00* (2013.01); *C08F 2500/01* (2013.01); *C08F 2500/04* (2013.01); *C08F 2500/05* (2013.01); *C08F 2500/09* (2013.01); *C08F 2500/17* (2013.01); *C08F 2500/19* (2013.01); *C08F 2500/21* (2013.01); *C08K 2003/2296* (2013.01); *C08L 2205/025* (2013.01); *C08L 2205/06* (2013.01); *C08L 2312/00* (2013.01); *C08L 2314/02* (2013.01)

(58) Field of Classification Search
CPC .. C08F 210/18; C08L 23/16; C08L 2205/025; C08L 2314/02
See application file for complete search history.

(56) References Cited

U.S. PATENT DOCUMENTS

| | | | | |
|---|---|---|---|---|
| 3,884,993 | A * | 5/1975 | Gros | C08J 3/005 525/211 |
| 3,980,623 | A | 9/1976 | Staib et al. | |
| 4,078,131 | A | 3/1978 | de Zarauz | |
| 4,722,971 | A | 2/1988 | Datta et al. | |
| 5,728,766 | A * | 3/1998 | Schauder | C08K 3/04 524/496 |
| 5,780,570 | A | 7/1998 | Tanaglia | |
| 6,686,419 | B2 * | 2/2004 | Wouters | C08F 210/18 524/554 |
| 7,915,354 | B2 * | 3/2011 | Wouters | C08F 210/18 526/143 |
| 10,072,146 | B2 * | 9/2018 | Wu | C08L 47/00 |
| 2008/0033107 | A1 | 2/2008 | Wouters et al. | |
| 2018/0355084 | A1 * | 12/2018 | Jourdain | C08F 210/18 |
| 2018/0371132 | A1 * | 12/2018 | Jourdain | C08F 210/18 |

FOREIGN PATENT DOCUMENTS

| | | |
|---|---|---|
| EP | 0 718 362 A | 6/1996 |
| WO | 93/121270 A | 10/1993 |

(Continued)

*Primary Examiner* — Rip A Lee

(57) ABSTRACT

Provided herein are multimodal elastomer compositions comprising a first polymer fraction and a second polymer fraction, and methods for making such compositions. The elastomer compositions are preferably ethylene, α-olefin, copolymers or ethylene, α-olefin, polyene terpolymers. The elastomer compositions have high Mooney viscosity, thereby providing for improved elastomeric properties in compounds and other articles formed from the elastomer compositions. Surprisingly, the high Mooney viscosity compositions exhibit a much lower than expected viscosity when formulated into elastomer compounds. Thus, the processing detriments typically associated with high Mooney viscosity elastomers are minimized through the use of the elastomer compositions, and methods for making them, disclosed herein.

24 Claims, No Drawings

(56) References Cited

FOREIGN PATENT DOCUMENTS

| WO | 00/26296 A | 5/2000 |
| WO | 03/066725 A | 8/2003 |
| WO | 2012/092491 A | 7/2012 |
| WO | 2017/127185 A | 7/2017 |

\* cited by examiner

HIGH MOLECULAR WEIGHT MULTIMODAL ELASTOMER COMPOSITIONS WITH GOOD PROCESSABILITY

CROSS-REFERENCE OF RELATED APPLICATIONS

This application is a National Phase application of PCT/US2016/066803, filed Dec. 15, 2016 and claims the benefit of Provisional Application No. 62/280,357, filed Jan. 19, 2016, and Provisional Application No. 62/412,514, filed Oct. 25, 2016, all of which are herein incorporated by reference.

FIELD OF THE INVENTION

This disclosure relates to ethylene-based copolymers, compositions comprising such copolymers, and methods of making them. In particular, the disclosure relates to high molecular weight ethylene-based elastomers, including high molecular weight ethylene copolymers such as EPDM terpolymers. The elastomers exhibit surprisingly good processability, despite having high molecular weights that are typically associated with detrimental impacts on processability.

BACKGROUND OF THE INVENTION

Elastomeric polymer compositions such as EPDMs (ethylene-propylene-diene terpolymers) are generally subject to tradeoffs in their manufacturing. EPDM compositions having polymeric molecules of higher molecular weight (i.e., longer chains, as indicated by higher Mooney viscosity) are frequently associated with gains in strength and other desired properties in articles made from such elastomeric polymer compositions. However, the longer the polymer chains of the composition (i.e., the higher Mooney viscosity), the more difficult the polymer and the composition are to process in various processing equipment used in manufacturing and transforming the elastomeric polymer from its raw state to a finished article (e.g., extruders, blenders, mixers, and the like).

In general, manufacturers of articles made from polymer compositions desire higher Mooney viscosity polymers, but incur increased costs in accounting for the higher difficulty in processing such polymer compositions with other components to formulate a finished article—that is, if processing of such formulations is even possible. Additional components are frequently added to a raw state elastomeric polymer composition in order to arrive at a formulation suitable for forming into a finished article—many of these components may further increase the viscosity of the formulation, enhancing processing difficulties.

To alleviate this problem, many producers of polymer compositions provide lower viscosity polymers, thereby sacrificing performance in finished articles, and/or requiring manufacturers to include additives to compensate for this shortcoming. Alternatively, producers of polymer compositions may include extender oil in the polymer composition provided to downstream manufacturers. Extender oil lowers the effective viscosity of the polymer composition, but again suffers from negative impacts to performance of the polymer. Extender oils furthermore add to the weight of the polymer composition, thereby increasing the cost for the elastomer producer and the price of the polymer composition for the downstream manufacturer.

As such, there remains a demand for elastomeric polymer compositions with higher Mooney viscosity, but which still exhibit good processability in downstream manufacturers' formulations for finished polymeric articles. Such a polymer composition that includes little to no extender oil would be highly desired from a manufacturer's point of view, since the manufacturer would be getting more (and stronger) polymer per given weight of polymer composition.

One approach to striking the balance between high Mooney viscosity and good processability is the production of an elastomeric polymer composition having bimodal composition distribution, meaning that there are two discernable fractions of polymer chains within the composition: one fraction having relatively low Mooney viscosity, and one fraction having relatively high Mooney viscosity. By maintaining an adequately large fraction of low Mooney polymers in the composition, balanced with a smaller fraction of high Mooney polymers, the resulting composition maintains the processability of the majority low Mooney fraction while exhibiting relative gains in strength owing to the minority large Mooney fraction. Such bimodal polymer compositions can be achieved by creating reactor blends, wherein two series or parallel polymerization reactors are used. Monomers and catalyst are fed to the first reactor, and the products are fed to the second reactor (optionally with additional monomer(s) and/or catalyst), wherein the higher Mooney viscosity polymers are produced (e.g., in part by further polymerization of the polymer chains formed in the first reactor). Reaction conditions are controlled in the first and second reactor to adjust the amounts of first and second polymer. As will be evident to the ordinarily skilled artisan, there are nearly infinite variations in the adjustments to be made in even this relatively simple dual series reactor set-up, with a daunting array of possible resulting polymer compositions.

Some commercially available Vistalon™ EPDM copolymers from ExxonMobil Chemical Company are reactor blends exhibiting such bimodal composition distribution. For instance, Vistalon™ 7500 is a reactor blend having relatively high Mooney viscosity.

Yet, another approach is provided in WIPO Publication No. WO 03/066725. In this approach, the bimodal composition distribution is maintained; however, the largest and smallest fractions are reversed relative to the polymer compositions just described. That is, in this so-called "reverse bi-modal" approach, the high Mooney fraction is larger (in terms of both concentration, as well as average polymer chain length) than the low-Mooney fraction.

Other references of interest include U.S. Pat. Nos. 3,980,623; 3,884,993; 4,078,131; and 6,686,419; U.S. Publication No. 2008/0033107; EP Patent No. 0 227 206 B2; as well as WIPO Publication Nos. WO 00/26296 and WO 03/066725.

SUMMARY OF THE INVENTION

The present inventors have discovered multimodal elastomer compositions that achieve similar high Mooney viscosities to the best-in-class high Mooney compositions currently available, but while surprisingly exhibiting superior performance in downstream manufacturers' formulation processing. In particular, such multimodal elastomer compositions exhibit significantly lower Mooney viscosity in typical rubber article formulations than one would expect based upon the Mooney viscosity of the elastomer composition itself, and certainly lower as compared to any similarly high Mooney polymer compositions currently available. This advantageously provides for better processing of the elastomer compositions, and furthermore allows for such advantages to be achieved without the use of extender oil in the elastomer composition, if so desired.

Accordingly, the present invention in some aspects provides a multimodal elastomer composition that is a blend comprising 85 to 95 wt % of a first polymer fraction and 5 to 15 wt % of a second polymer fraction, said wt % s being determined on the basis of the total weight of the reactor blend. The blend is preferably a reactor blend, such as a series reactor blend. The first polymer fraction has Mooney viscosity lower than the second polymer fraction. Preferably, the second polymer fraction has ultra-high Mooney viscosity, such as greater than 300 Mooney Units (MU) (ML, 1+8@150° C.). The first polymer fraction may have Mooney viscosity of at least 50 MU, such as 50-75 MU (ML, 1+8@150° C.). The blend therefore may exhibit (i) Mooney viscosity within the range of 70 to 100 MU (ML, 1+8@150° C.). Blends of such embodiments may also exhibit one or more of the following properties: (ii) MLRA/ML measured at 150° C. within the range from 10-15 sec; (iii) molecular weight distribution (MWD) within the range from 4 to 10; and (iv) branching index of 6 to 10, as measured by Rubber Process Analyzer at 150° C., 0.63 radian/sec, and 1000% oscillation amplitude.

In yet further aspects, the first polymer fraction may have even higher Mooney viscosity, such as within the range from 65 to 90 MU (ML, 1+8@150° C.), while the second polymer fraction still has ultra-high Mooney viscosity (e.g., greater than 300 MU), such that the blend exhibits (i) Mooney viscosity within the range from 75 to 150 MU, such as 80 to 120 (ML, 1+8@150° C.). Such very high Mooney embodiments may be particularly useful as sponge or foam grade elastomers (e.g., those suitable for foaming). Blends according to these embodiments may also exhibit one or more of the following properties: (ii) MLRA/ML measured at 150° C. within the range from 11 to 20 sec; (iii) molecular weight distribution (MWD) within the range from 4 to 10; and (iv) branching index within the range from 3 to 7, as measured by Rubber Process Analyzer at 150° C., 0.63 radian/sec, and 1000% oscillation amplitude.

Each of the first and second polymer fractions in blends of the various embodiments preferably comprises copolymers derived from ethylene, one or more $C_3$-$C_{20}$ α-olefins, and optionally one or more non-conjugated polyenes (such as one or more non-conjugated dienes). Preferably, the α-olefin is propylene and the polyenes are one or more dienes, such that the reactor blend comprises a first EPDM fraction and a second EPDM fraction.

Reactor blends of various embodiments are preferably formed by Ziegler-Natta polymerization, such as using a Ziegler-Natta catalyst system comprising a catalyst and co-catalyst. The catalyst in some embodiments is a $VCl_4$ catalyst, preferably employed in conjunction with ethyl aluminum sesquichloride (EASC) co-catalyst. The polymerization process in some aspects includes providing a plurality of monomers comprising ethylene, one or more α-olefins, and optionally one or more non-conjugated polyenes to a series of at least two polymerization reaction zones, such that effluent comprising a first polymer reaction product of the first reaction zone (i.e., a first polymer fraction) is provided to the second reaction zone, thereby forming a reactor blend that is withdrawn from the second reaction zone. The reactor blend comprises (i) the first polymer fraction formed in the first reaction zone and (ii) the second polymer fraction formed in the second reaction zone. Reaction conditions are controlled so as to obtain particular polysplit (i.e., relative amounts of first and second polymer fractions in the reactor blend), preferably 88-89 wt % of the first polymer fraction in the blends of some embodiments, or 80-95 wt %, such as 88-92 or 89-91 wt % of the first polymer fraction in the blends of other embodiments (e.g., very high Mooney blends suitable for sponge grades). At the same time, conditions in each reaction zone are also controlled to both (1) increase the average chain length (and therefore, increase Mooney viscosity) of the first polymer fraction, and (2) decrease the average chain length (and therefore, decrease Mooney viscosity) of the second polymer fraction, relative to conventional ethylene-based elastomer reactor blends.

The present invention in further aspects also includes compounds formed from an elastomer composition of some embodiments, such as an elastomer compound made by mixing a formulation comprising: an at least partially cross-linked elastomer composition, one or more vulcanization activators; one or more vulcanizing agents; and, optionally, one or more further additives. Yet further aspects include a foamed profile formed from an elastomer composition of certain embodiments (e.g., very high Mooney blends).

DETAILED DESCRIPTION OF THE EMBODIMENTS

Definitions

Definitions applicable to the presently described invention are as described below, as are methods of measurement of some properties relevant to certain embodiments of the invention.

As used herein, wt % means percent by weight, or weight percentage, and wppm means parts per million, on a weight basis. Unless otherwise indicated, percentages and ppm values should be assumed to be wt % and wppm.

The numbering scheme for the Periodic Table Groups is as disclosed in Chemical and Engineering News, 63(5), 27 (1985).

As used herein, a "$C_x$ hydrocarbon," where x is an integer, refers to a hydrocarbon compound having X carbon atoms. Thus, a $C_6$ hydrocarbon is a hydrocarbon having 6 carbon atoms. Similarly, a "$C_x$-$C_y$ hydrocarbon" or a "$C_{x-y}$ hydrocarbon" is a hydrocarbon having from x to y carbon atoms, inclusive (e.g., a $C_6$-$C_{10}$ or $C_{6-10}$ hydrocarbon is a hydrocarbon having 6, 7, 8, 9, or 10 carbon atoms).

Reference is made herein to polymers comprising various monomeric units, e.g., ethylene-derived units, ethylene units, or simply ethylene. Where a polymer is referenced as comprising "ethylene units" or "ethylene," it should be understood to mean that the polymer contains "ethylene-derived units"—that is, ethylene in its polymerized form (—$CH_2CH_2$—). The same should be assumed for references to any other monomeric units making up a polymer (e.g., propylene or propylene-derived units).

The term "elastomer," as used herein, refers to any polymer or combination of polymers consistent with the ASTM D1566 definition of "a material that is capable of recovering from large deformations, and can be, or already is, modified to a state in which it is essentially insoluble (but can swell) in boiling solvent." As used herein, the term "elastomer" may be used interchangeably with the term "rubber." Preferred elastomers have a melting point that cannot be measured by DSC or if it can be measured by DSC is less than 50° C., or preferably less than 30° C., or less than 0° C. Preferred elastomers have a Tg of −20° C. or less as measured by DSC.

As used herein, "molecular weight distribution" (MWD), also referred to as "polydispersity," represents the weight average molecular weight divided by the number average molecular weight (Mw/Mn) of the polymer. Determination of Mw and Mn values are discussed in more detail below.

"Multimodal," in reference to a polymer or elastomer composition, means that the composition comprises a combination of at least two fractions, referred to as a first polymer fraction and as a second polymer fraction. However, it is noted that the numbering of the fractions are for convenience purposes only and in the absence of any direct indication otherwise, the numbering of the fractions does not necessarily refer to any order in which the fractions are produced, blended, or otherwise included into the multimodal polymer compositions disclosed herein. The multimodality of the multimodal polymer compositions may manifest itself as two distinct peaks, or as a main peak and a shoulder peak in the Mw signal as determined using GPC-SEC chromatography in combination with a light scattering (LS) detector (discussed in more detail below).

Notwithstanding the foregoing paragraph, where a multimodal polymer or elastomer composition comprises a series reactor blend according to some embodiments herein, the first polymer fraction may be considered as the polymer reaction product of the first reactor in the series reaction process (which polymer reaction product may be withdrawn from said first reactor for direct measurement of desired properties, such as molecular weights and/or Mooney viscosity, discussed in more detail herein). The second polymer fraction may be considered as the polymer reaction product of the second polymerization reactor in the series reaction process. Although direct measurement of properties of the second polymer fraction of such embodiments may be difficult (as the second polymer fraction will be intermixed with the first polymer fraction in the effluent exiting the second polymerization reactor), properties of the overall series reactor blends (i.e., of the multimodal blend itself) may be measured. Properties of the second polymer fraction may thereafter be calculated based upon the measured blend properties and the measured properties of the first polymer fraction, obtained per the above description. Calculations of relevant properties in such instances are described herein in connection with the property of interest.

Similarly, where a multimodal polymer or elastomer composition comprises another blend, such as a physical or other post-reactor blend of two or more polymers, each polymer composition mixed together (e.g., a first polymer composition and second polymer composition) to form the blend may be taken as a fraction of the resulting blend. In such instances, direct measurement of relevant properties (e.g., molecular weights and/or Mooney viscosity) may be carried out on each polymer composition prior to mixing to form the blend.

As used herein, the term "reactor blend," also sometimes referred to as an "intimate blend," refers to a polymer composition comprising two or more fractions of polymer chains (as in the multimodal polymer composition described above) made in the same reactor or in multiple reactors (either in series or parallel). A "series reactor blend" refers to a reactor blend produced by series polymerization (e.g., two or more polymerization reaction zones operated in series, such that at least a portion of the polymerization effluent from the first reaction zone is provided as feed to the second reaction zone). A "blend" may refer to either a reactor blend, as just defined, or a physical (e.g., post-reactor) blend, such as made by physically mixing two or more polymer compositions in a mixer, extruder, or the like.

As used herein, "extender oil" and "process oil" may have similar compositions, or be selected from the same or similar compounds. The terms are used to distinguish the timing in the manufacturing cycle of elastomers at which the oil is introduced. "Extender oil" is oil that is added to or otherwise incorporated with an elastomer following its polymerization, e.g., incorporated (along with any other desired additives) as part of the elastomer pellets, bales, or the like that are shipped or otherwise provided to downstream manufacturers, who in turn process the elastomer into intermediate products and/or finished goods. "Process oil" is formulated with the elastomer during such downstream manufacturing (e.g., during extrusion, mixing, or other processing of the elastomer and other components in forming an article of manufacture from the elastomer).

As used herein, a "polymerization reaction zone" is a zone or space in which a polymerization reaction takes place. It may be a discrete polymerization reactor, or it may be a discrete location or zone within a reactor housing multiple reaction zones.

Mooney Viscosity Determinations

Monomer contents may be determined by any suitable means, with techniques based on nuclear magnetic resonance (NMR) spectroscopy being preferred (e.g., $^1$H NMR and $^{13}$C NMR).

"Mooney viscosity" as used herein is the Mooney viscosity of a polymer or polymer composition. Unless otherwise indicated, Mooney viscosity is measured using a Mooney viscometer according to ASTM D1646, but with the following modifications/clarifications of that procedure. First, sample preparation is carried out according to the following modifications/clarifications: sample polymer (250 g) is massed on a roll mill prior to testing. The mill temperature is 150° C.+/−5° C. instead of the 50+/−5° C. recommended in ASTM D1646, because 50° C. may cause a mechanical degradation (breakdown) of the molecular chain. A piece of raw polymer sample undergoes 10 passes between the rolls, per the following procedure: (1) allow for sufficient gap between the cylinder to introduce the polymer and warm it up during the $1^{st}$ and $2^{nd}$ passes; (2) set the gap to 1.4 mm+/−0.1 before the $3^{rd}$ pass; (3) re-introduce the polymer sample (in the form of a sheet) and fold it on itself at each pass until the $9^{th}$ pass; and (4) before the $9^{th}$ pass, set the gap to 2.0-2.5 mm, in order to produce a thick sample sheet of 8.0+/−0.5 mm. Thereafter, the sample is die-cut, and the ASTM D1646 viscosity measurement procedure followed. Further, although ASTM D1646 allows for several options for die protection, should any two options provide conflicting results, PET 36 micron should be used as the die protection. In addition, ASTM D1646 does not indicate a sample weight in Section 8; thus, to the extent results may vary based upon sample weight, Mooney viscosity determined using a sample weight of 21.5+/−2.7 g in the ASTM D1646 Section 8 procedures will govern. Finally, the rest procedures before testing set forth in D1646 Section 8 are 23+/−3° C. for 30 min in air; ML as reported herein were determined after resting at 24+/−3° C. for 30 min in air.

The results of the viscosity test are reported as (ML, 1+8@150° C.), where M is the Mooney viscosity number, L denotes use of the large rotor (defined as ML in ASTM D1646-99), 1 is the pre-heat time in minutes, 8 is the sample run time in minutes after the motor starts, and 150° C. is the test temperature. Thus, a Mooney viscosity of 90 determined by the aforementioned method would be reported as a Mooney viscosity of 90 (1+8@150° C.). Alternatively, the Mooney viscosity may be reported as 90 MU; in such instance, it should be assumed that the just-described method is used to determine such viscosity, unless otherwise noted (for instance, Mooney viscosity may be noted as being measured at (1+4@125° C.), indicating sample run time of 4 minutes, with test temperature of 125° C.).

The torque limit of the Mooney viscometer is about 100 Mooney units (MU). Mooney values greater than about 100 Mooney units generally cannot be measured under these conditions. In this event, a non-standard rotor design is employed with a change in Mooney scale that allows the same instrumentation on the Mooney viscometer to be used for more viscous polymers. This rotor is both smaller in diameter and thinner than the standard ML rotor, and thus it is termed MST (Mooney Small-Thin). MST methods may be used to determine viscosity of polymers having viscosity greater than 100 Mooney units as described in Col. 5, lines 15-52 of U.S. Pat. No. 9,006,332, which description is incorporated herein by reference. In particular, MST may be determined and reported as (MST, 5+4@200° C.), meaning a 5 minute pre-heat and 4-minute torque recording at 200° C. is used with the MST rotor. Further, if Mooney viscosity is reported herein as MU, MST, then it should be assumed unless otherwise noted that the just-described method for determining MST viscosity is used.

The MST rotor should be prepared as follows:
1. The rotor should have a diameter of 30.48+/−0.03 mm and a thickness of 2.8+/−0.03 mm (tops of serrations) and a shaft of 11 mm or less in diameter.
2. The rotor should have a serrated face and edge, with square grooves of 0.8 mm width and depth of 0.25-0.38 mm cut on 1.6 mm centers. The serrations will consist of two sets of grooves at right angles to each other (form a square crosshatch).
3. The rotor shall be positioned in the center of the die cavity such that the centerline of the rotor disk coincides with the centerline of the die cavity to within a tolerance of +/−0.25 mm. A spacer or a shim may be used to raise the shaft to the midpoint.
4. The wear point (cone shaped protuberance located at the center of the top face of the rotor) shall be machined off flat with the face of the rotor.

"MLRA" as used herein is Mooney Relaxation Area, reported as the Mooney Large Relaxation Area, and "MSTRA" is the Mooney Relaxation Area reported as Mooney Small-Thin Relaxation Area. The MLRA and MSTRA data are obtained from the Mooney viscosity measurement (ML and MST, respectively, as applicable) when the rubber relaxes after the rotor is stopped. Each of the MLRA and the MSTRA is the integrated area under the Mooney torque-relaxation time curve from 1 to 100 seconds. MLRA and MSTRA are each a measure of chain relaxation in molten polymer and can each be regarded as a stored energy term which suggests that, after the removal of an applied strain, the longer or branched polymer chains can store more energy and require longer time to relax. Therefore, the MLRA or MSTRA value of a bimodal rubber (the presence of a discrete polymeric fraction with very high molecular weight and distinct composition) or a long chain branched rubber are larger than a broad or a narrow molecular weight rubber when compared at the same Mooney viscosity values (ML or MST, respectively).

Mooney Relaxation Area (MLRA or MSTRA) is dependent on the Mooney viscosity of the polymer, and increases with increasing Mooney viscosity. In order to remove the dependence on polymer Mooney Viscosity in the case of ML-based Mooney viscosities, a corrected MLRA (cMLRA) parameter may be used, where the MLRA of the polymer is normalized to a reference of 80 Mooney viscosity. The formula for cMLRA is provided below:

$$cMLRA = MLRA\left(\frac{80}{ML}\right)^{1.44}$$

where MLRA and ML are the Mooney Relaxation Area and Mooney viscosity of the polymer sample measured at 125° C. Similarly, a cMSTRA can be used, derived from a similar correlative equation, with MST in place of ML, and adjustment of the correlative numbers:

$$cMSTRA = MSTRA\left(\frac{50}{MST}\right)^{1.44}.$$

Alternatively, the ratio MLRA/ML may be used to encompass both the MLRA and ML data, in view of MLRA's dependence upon ML (although it should be noted this does not remove the dependency of MLRA on ML; it simply ensures that both terms are encompassed). Such measurement may be particularly useful where comparing polymers with Mooney viscosities within 10% of one another. Similarly, the ratio MSTRA/MST may be used to encompass both the MSTRA and MST data, in view of MSTRA's dependence upon MST, particularly when comparing polymers with Mooney viscosities within 10% of one another. Each ratio has the dimension of time. A higher MLRA/ML (or MSTRA/MST) number signifies a higher degree of melt elasticity for materials with similar value of ML or MST, as applicable. Long chain branching will slow down the relaxation of the polymer chain, hence increasing the value of MLRA/ML or MSTRA/MST.

Molecular Weight Determinations

Molecular weights (number average molecular weight (Mn), weight average molecular weight (Mw), and z-average molecular weight (Mz)) are determined using a Polymer Laboratories Model 220 high temperature GPC-SEC (gel permeation/size exclusion chromatograph) equipped with on-line differential refractive index (DRI), light scattering (LS), and viscometer (VIS) detectors. It uses three Polymer Laboratories PLgel 10 m Mixed-B columns for separation using a flow rate of 0.54 ml/min and a nominal injection volume of 300 microliter. The detectors and columns were contained in an oven maintained at 135° C. The stream emerging from the SEC columns was directed into the miniDAWN optical flow cell and then into the DRI detector. The DRI detector was an integral part of the Polymer Laboratories SEC. The viscometer was inside the SEC oven, positioned after the DRI detector. The details of these detectors as well as their calibrations have been described by, for example, T. Sun et al., in Macromolecules, Volume 34, Number 19, pp. 6812-6820, (2001), incorporated herein by reference.

Solvent for the SEC experiment was prepared by dissolving 6 grams of butylated hydroxy toluene (BHT) as an antioxidant in 4 liters of Aldrich reagent grade 1, 2, 4-trichlorobenzene (TCB). The TCB mixture was then filtered through a 0.7 micrometer glass pre-filter and subsequently through a 0.1 micrometer Teflon filter. The TCB was then degassed with an online degasser before entering the SEC. Polymer solutions were prepared by placing dry polymer in a glass container, adding the desired amount of BHT stabilized TCB, then heating the mixture at 160° C. with continuous agitation for about 2 hours. All quantities were measured gravimetrically. The TCB densities used to express the polymer concentration in mass/volume units are 1.463 g/mL at 22° C. and 1.324 g/mL at 135° C. The injection concentration was from 1.0 to 2.0 mg/mL, with lower concentrations being used for higher molecular weight samples. Prior to running a sample the DRI detector and the injector are purged, flow rate increased to 0.5 ml/min, and the DRI allowed to stabilize for 8 to 9 hours before injecting the first sample. The LS laser is turned on 1 hour before running samples.

The concentration, c, at each point in the chromatogram is calculated from the baseline-subtracted DRI signal, $I_{DRI}$, using the following equation:

$$c = K_{DRI} I_{DRI} (dn/dc)$$

where $K_{DRI}$ is a constant determined by calibrating the DRI with a series of mono-dispersed polystyrene standards with molecular weight ranging from 600 to 10M, and (dn/dc) is the refractive index increment for the system. The refractive index, n=1.500 for TCB at 145° C. and λ=690 nm. For purposes of this invention and the claims thereto (dn/dc)=0.1048 for ethylene-propylene copolymers, and (dn/dc)=0.01048−0.0016ENB for EPDM, where ENB is the ENB content in wt % in the ethylene-propylene-diene terpolymer. Where other non-conjugated polyenes are used instead of (or in addition to) ENB, the ENB is taken as weight percent of total non-conjugated polyenes. The value (dn/dc) is otherwise taken as 0.1 for other polymers and copolymers. Units of parameters used throughout this description of the SEC method are: concentration is expressed in g/cm³, molecular weight is expressed in g/mol, and intrinsic viscosity is expressed in dL/g.

The light scattering (LS) detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, ΔR(θ) is the measured excess Rayleigh scattering intensity at scattering angle θ, c is the polymer concentration determined from the DRI analysis, $A_2$ is the second virial coefficient (for purposes of this invention, $A_2$=0.0015 for ethylene homopolymer; $A_2$=0.0015−0.00001EE for ethylene-propylene copolymers, where EE is the ethylene content in weight percent in the ethylene-propylene copolymer; and $A_2$ is 0.001 otherwise). P(θ) is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

For purposes of this application, where DRI and LS measurements conflict, LS measurements should be used for Mw and Mz, while DRI measurements should be used for Mn. Where molecular weight distribution (MWD) values are reported as Mw/Mn, such values should be assumed to be Mw(LS)/Mn(DRI), unless specifically stated otherwise.

Branching Index

The rheological properties of polymer compositions, such as Branching Index (BI) are studied using a rubber process analyzer (RPA) using a Large Amplitude Oscillatory Shear (LAOS) method according to the following description. Large Amplitude Oscillatory Shear (LAOS) can provide useful non-linear characteristics of polymers. LAOS can be described as the oscillatory strain domain where the shear complex modulus (G*) is a function of both the angular frequency and strain. LAOS tests are conducted with a rubber process analyzer, here the ATD® 1000 rubber process analyzer is commercialized by Alpha Technologies. The ATD® 1000 is a dynamic mechanical rheological tester designed for testing unfilled elastomers and compounds. Except where otherwise noted, rheological tests using LAOS were carried out at a temperature of 150° C., strain amplitude of 1000% and shear frequency of 0.63 rad/sec. The input strain is represented by the function: $\gamma = \gamma_0 \sin(\omega t)$, where $\gamma_0$ is the strain amplitude. As can be seen, the function has time dependence. The stress response of the polymer sample is measured using the following Fourier series, which is a function of time, angular frequency, and strain amplitude as shown below.

$$\sigma(t; \omega; \gamma_0) = \gamma_0 \sum_n \{G'(\omega, \gamma_0) \sin n\omega t + G''(\omega, \gamma_0) \cos n\omega t\}$$

G' and G'' correspond to the real and imaginary components of the complex modulus, G*. Put another way, G' corresponds to the shear storage modulus (Pa), and G'' to the shear loss modulus (Pa). The odd harmonics of this Fourier series ($G_1'$, $G_3'$, $G_5'$, etc.) are calculated by the RPA.

The Branching Index BI is calculated according to the method described in Florian J. Stadlera, Adrien Leyguea, Henri Burhin, Christian Baillya, *Polymer Reprints*, 2008, 49(1) 121-122 (see also H. G. Burhin, N. Rossion, C. Bailly, A. Leygue, R. Kuenings, in *FT Rheology and Large Amplitude Oscillatory Shear (LAOS), an interesting tool to study polymer architecture*, International Rubber Conference IRC 2006, Lyon, France (2006); A. Leygue, N. Roisson, C. Bailly, R. Keunings, in *Study of reversing flows of linear entangled polymers through constitutive models*, AERC, Hersonisos, Crete, Greece (2006); and Burhin et. al., in *XVth International Congress on Rheology*, Monterey, Calif. (August 2008)). In particular, the following expressions are used:

$$BI = \frac{G_1'}{G_5'} - E_3$$

$$E_3 = \frac{5}{4} + \frac{1}{4}\left(\frac{G_3'}{G_5'}\right)^2 - \frac{1}{2}\frac{G_3'}{G_5'}$$

where, $G_1'$, $G_3'$ and $G_5'$ are the first, third and fifth harmonics associated with the real component G' of the complex modulus (G*). Higher BI typically indicates increased polymer branching and/or polydispersity. For instance, typically narrow MWD EPDM terpolymers have a BI ~1, broad MWD EPDMs have BI of ~4, and a bimodal EPDM composition would be expected to have a BI ~7.

Tan(δ), Dynamic Viscosity, and Shear Thinning Ratio

Tan(δ), dynamic viscosity, and Shear Thinning Ratio (STR) are also determined using an RPA (e.g., an ATD® 1000 rubber process analyzer commercialized by Alpha Technologies). For these measurements, unless indicated otherwise, one should use the RPA at a temperature of 125° C., according to a deformation strain of 14% within a range of shear frequencies varying from 0.3 rad/sec to 300 rad/sec, as indicated in the context for each reported measurement. Where not otherwise indicated in context, it is preferred to use 11 rad/sec for determining tan(δ), and STR should be taken as the ratio of dynamic viscosity η' measured at 11 rad/sec, divided by dynamic viscosity η' measured at 300 rad/sec. The rheometer captures values of dynamic viscosity η' and values of modulus G' and G" in KPa. Tan(δ) is calculated from these measured values as G"/G'.

Ethylene Content

Ethylene content is determined using FTIR according to the ASTM D3900. ENB content is determined using FTIR according to ASTM D6047. The content of other diene, if present, can be obtained using $C^{13}$ NMR. Ethylene wt % s are corrected for measured diene by the following calculation: (% C2 (uncorr)/(100+% diene)*100).

Other Properties

Unless otherwise indicated or apparent from the context herein, for purposes of the present specification and claims, Hardness should be measured per ASTM D2240; Modulus at 100% per ASTM D412; Tensile Strength and Elongation at Break per DIN 53504 S2; Green Tear at ASTM D624 (Die C); Compression set at 25% deflection per ASTM D395-B; and vulcanization properties (e.g., cure rate, cure state) should be obtained in accordance with ASTM D5289.

Make-Up of the Multimodal Elastomer Compositions

As noted previously, the present invention in some aspects provides multimodal elastomer compositions, and methods of making such compositions. In some embodiments, the multimodal elastomer compositions may be characterized as bimodal elastomer compositions (i.e., comprising two identifiable fractions of polymer: a low Mooney viscosity fraction, sometimes referred to as a "first polymer fraction," and a high Mooney viscosity fraction, sometimes referred to as a "second polymer fraction"). In certain embodiments, the surprisingly advantageous processability of the elastomer compositions is achieved through careful control of one or more of: (i) relative amounts of the first polymer fraction; (ii) average chain length of the first polymer fraction; (iii) relative amounts of high Mooney fraction; and (iv) average chain length of the high Mooney fraction. In particular, advantageous processing is achieved in certain embodiments exhibiting, as compared to some conventional bimodal polymer compositions, (i) relatively smaller amounts of the first polymer fraction, but (ii) longer average chain length of the same fraction, and concomitantly (iii) greater relative amounts of second polymer fraction, with (iv) slightly shorter average chain length. These properties are preferably achieved through creation of a blend, most preferably a reactor blend, as discussed in greater detail below.

Further, without wishing to be bound by theory, it is believed that blends according to some embodiments indicate elastomeric compositions of different structure (chain length, branching) as compared to conventional elastomeric compositions, as illustrated, e.g., by the ratio of compound Mooney viscosity to elastomer Mooney viscosity, and as further illustrated by the ratio MLRA/ML (Mooney stress relaxation/Mooney viscosity). Compound Mooney and the ratio of compound Mooney to elastomer Mooney are discussed in more detail herein below.

The multimodal elastomer composition of some embodiments is preferably a blend of 85 to 95 wt % (preferably 88 to 90 wt %, or 88 to 92 wt %, such as 88.5 to 89.5 wt %) of a first polymer fraction and 5 to 15 wt % (preferably 10 to 12 wt %, or 8 to 12 wt %, such as 10.5 to 11.5 wt %) of a second polymer fraction, said wt % s being determined on the basis of the total weight of the blend and with ranges from any of the foregoing lows to any of the foregoing highs for each fraction's wt % also contemplated in various embodiments.

The first polymer fraction has Mooney viscosity lower than the second polymer fraction (put in other terms, the first polymer fraction has lower average chain length, and therefore lower Mn and/or Mw, than the second polymer fraction). However, the first polymer fraction of some preferred embodiments has a higher than conventional Mooney viscosity value, even for a "low" Mooney viscosity fraction. In particular, in such embodiments, the first polymer fraction has Mooney viscosity (ML, 1+8@150° C.) of at least 50, preferably at least 60, more preferably at least 65 MU (such as within the range of 50-75 MU, preferably 60-75 MU, such as 65-74 MU, or more preferably 68-72 MU, with ranges from any of the foregoing lows to any of the foregoing highs also contemplated in various embodiments).

In other embodiments, the Mooney viscosity of this "low" Mooney fraction may be pushed even higher, such as within the range from 65 to 90 MU, preferably 70 to 80 MU (ML, 1+*@150° C.), with ranges from any of the foregoing lows to any of the foregoing highs also contemplated in various embodiments. Such embodiments are advantageous for producing very high Mooney viscosity polymer blends, which may be particularly well-suited for sponge or foaming grades. Such grades need not be oil extended, like other polymer blends of various embodiments described herein. But, formulations for forming foamed articles from such polymer blends typically include high amounts of process oil, and optionally one or more foaming agents, among other additives, so as to achieve suitable softness of the foamed article. It is believed that a polymer blend having higher molecular weight (i.e., higher Mooney viscosity) is more readily able to absorb this additional process oil in downstream foaming and article formation. Preferably, when forming a sponge-grade bimodal copolymer composition according to such embodiments, the higher Mooney viscosity of the blend is achieved by adjusting Mooney viscosity of this first polymer fraction upward.

As noted, the second polymer fraction has higher Mooney viscosity than the first polymer fraction; however, in some preferred embodiments, the second polymer fraction is controlled to have slightly lower Mooney viscosity (i.e., shorter average polymer chain length) as compared to similar conventional multimodal elastomer compositions. For instance, the Mooney viscosity of the second polymer fraction of such embodiments may range from about 250-1200, such as 250-900, or 300-600 MU, with ranges from any of the foregoing lows to any of the foregoing highs also contemplated in various embodiments. In some particular embodiments, Mooney viscosity of the second polymer fraction is within the range of 250-500, such as 275-400, or 300-350 MU, again with ranges from any of the foregoing lows to any of the foregoing highs also contemplated in various embodiments. In yet other embodiments, the second fraction's viscosity is within the range of 300-1200 MU, such as 300-1100 or 400-800 MU, or 500-1000 MU, such as 550-750, or 600-700 MU, again with ranges from any of the foregoing lows to any of the foregoing highs also contemplated in various embodiments. In certain embodiments, the Mooney viscosity of the second polymer fraction is at least 150, preferably at least 200, more preferably at least 230 Mooney units greater than the Mooney viscosity of the first polymer fraction.

Mooney viscosity of the overall blend preferably is at least 70 MU, more preferably at least 80 MU. For instance, the overall blend Mooney viscosity in some embodiments may range from 70-100 MU, such as 80-100 MU, preferably 77 to 87 MU, or 75-95 MU (such as, e.g., 80-95, 80-90, or 80-85 MU), with ranges from any of the foregoing lows to any of the foregoing highs also contemplated in various embodiments. Blends according to yet other embodiments may exhibit even higher Mooney viscosities (e.g., blends in which the first polymer fraction has relatively higher Mooney viscosity). Such blends are the previously-described very high viscosity blends that are particularly useful in sponge or foaming grades. Blends of these embodiments may have Mooney viscosity within the range from 75 to 150 MU, such as 80 to 120, 85 to 100 MU, 85 to 95 MU, or 90 to 100 MU, with ranges from any of the foregoing lows to any of the foregoing highs also contemplated in various embodiments.

All of the aforementioned MU values for the blend and the first and second polymer fractions are measured as ML, 1+8@150° C.

As noted previously, in embodiments wherein the multimodal elastomer composition is a series reactor blend, it can be difficult, if not impossible, to measure the viscosity of the second polymer fraction alone, since the second fraction will be intermixed with the first polymer fraction in the effluent of the series polymerization process. However, the viscosity of the first reactor product (i.e., the first polymer fraction) may be directly measured by removing some product from the stream fed from the first reactor to the second reactor (see below for more details on series reactor blend polymerization). Such sample of first reactor product should be quenched and devolatilized by hot water to stop the polymerization and to remove excess solvent prior to subjecting the sample to the above-described Mooney viscosity measurement procedure (or to any other procedure for measuring properties, such as GPC for determining molecular weights). Further, the final product of the second series reactor (containing both first and second polymer fraction) may be directly analyzed (again, after quenching and devolatilization) to determine its Mooney viscosity. Knowing the overall blend viscosity and the first fraction's viscosity allows calculation of the second fraction's viscosity, using the relationship:

$$\log ML = n_A \log ML_A + n_B \log ML_B \quad (1)$$

where ML is the Mooney large viscosity of the blend of two polymers A and B each having individual Mooney viscosities $ML_A$ and $ML_B$, respectively (as measured by the same procedure, such as 1+8@150° C. as described above); and $n_A$ and $n_B$ represent the weight fractions of components A and B in the blend. In certain embodiments, a calculated Mooney viscosity of a second polymer fraction according to some embodiments (e.g., a second fraction obtained in series polymerization) may return a very high Mooney viscosity value, well over 100. Thus, notwithstanding the above discussion relating to use of MST (Mooney small-thin) measurement methods for very high viscosity polymers, these calculated Mooney values are reported as ML (1+8, @150° C.) based on the Mooney measurement methods used to obtain Mooney values for the (i) first fraction and (ii) overall blend.

Each of the first and second polymer fractions preferably comprises (or, in some embodiments, consists essentially of or consists of) copolymers derived from ethylene, one or more α-olefins, and optionally one or more non-conjugated polyenes (such as one or more non-conjugated dienes). As used in this context, "consists essentially of" allows for presence of minor impurities (e.g., less than 100 ppm by weight) resulting from a typical polymerization process (e.g., solvent or catalyst material, such as a Group 4 metal remaining from use of Ziegler-Natta type polymerization catalysts). Suitable α-olefins include $C_3$-$C_{20}$ α-olefins, with propylene, 1-butene, and 1-octene preferred (propylene being particularly preferred in some embodiments). Suitable non-conjugated polyenes include any polyene described in Paragraph [220] of U.S. Publication No. 2015/0025209 (the description of which is incorporated herein by reference), with 5-ethylidene-2-norbornene (ENB) and/or 5-vinyl-2-norbornene (VNB) particularly preferred. A preferred polymer fraction (for either or both of the first and second polymer fractions) thus comprises EP(D)M, a copolymer of ethylene, propylene, and optionally one or more dienes (preferably including ENB and/or VNB, most preferably ENB, where the one or more dienes are present). Where the one or more dienes are present in the first and/or second polymer fractions, the referenced polymer fraction may be referred to as an EPDM fraction.

The identities of monomers of each of the first and second fractions may be different, but they are preferably the same (e.g., such that both the first and second fractions comprise EPDM terpolymers; that is, such that the first and second polymer fractions are first and second EPDM fractions, respectively).

Whether the same or different in terms of monomer identities, the monomeric make-up of each fraction (i.e., the wt % of units derived from each monomer in the respective first and second fractions) may be the same or different.

Preferably, each polymer fraction comprises about 40-80, such as 40-70, or 50-60, wt % ethylene-derived units, the wt % based upon the total weight of each respective polymer fraction. Further, each polymer fraction preferably comprises about 0-15, more preferably about 4-10, such as 5-9, wt % non-conjugated polyene-derived units (preferably diene-derived units, with ENB- or VNB-derived units being particularly preferred). In yet other embodiments, such as the previously-noted very high viscosity blends suitable for foaming or sponge grades, the polyene-derived content of each polymer fraction is within somewhat higher ranges, such as within the range from 7 to 15, 7 to 12, or 8 to 12 wt %, based on the weight of each respective polymer fraction, and with ranges from any of the foregoing lows to any of the foregoing highs also contemplated. Such higher polyene content may aid in faster and more controllable cross-linking of the blend in forming a foamed article. The $C_3$-$C_{20}$ α-olefin-derived units (preferably propylene-derived units) make up the balance of each polymer fraction (e.g., ranging from 5 to 60 wt %, inclusive, depending upon amounts of ethylene and non-conjugated polyene-derived units).

In some embodiments, the ethylene content of the second polymer fraction is 2-4 wt % greater than the ethylene content of the first polymer fraction (e.g., such that where the first polymer fraction has 55 wt % ethylene content based upon the weight of the first polymer fraction, the second polymer fraction may have 57-59 wt % ethylene content based upon the weight of the second polymer fraction). In a similar manner, the polyene (e.g., diene such as ENB) content of the second polymer fraction may be 1-2 wt % greater than the polyene content of the first polymer fraction. In yet other embodiments, however, the two fractions preferably have roughly similar compositions, meaning that each of the ethylene content, polyene content, and other comonomer content of the second polymer fraction is within 2 wt %, more preferably within 1 wt % or even 0.5 wt %, of the ethylene content, polyene content, and other comonomer content, respectively, of the first polymer fraction.

The ethylene-derived content of the overall blend of some embodiments is preferably 40-70, such as 50-60 wt %, by weight of the blend. Blends of particular embodiments comprise 52-58 wt % ethylene, by weight of the blend. The polyene content of the blend may be within the range from 5-10, preferably 5-8, such as 6-7.5, 6.5-7.5, or 6.5-7 wt %, by weight of the blend. Polyene-derived content of the overall blend of yet other embodiments (e.g., very high Mooney blends suited to foaming or sponge grades, noted above) may be within higher ranges, such as within the range from 7-15, 7-12, or 8-12 wt %, with ranges from any of the foregoing lows to any of the foregoing highs also contemplated. The balance of the blend is made up of the one or more α-olefins, preferably one α-olefin, such as propylene, 1-butene, or 1-octene.

As noted, the blend is preferably a reactor blend, such as a series reactor blend. In such embodiments, as noted above, there may be no product stream comprising the second fraction that does not also comprise the first fraction. However, the amount of units derived from a given monomer X in the first fraction and in the overall blend may be measured directly, as noted above with respect to measuring Mooney viscosity of the blend and first fraction. From these values, the amount of units derived from the given monomer X in the second fraction of the reactor blend may be calculated using the relationship:

$$X_{blend} = n_A X_A + n_B X_B \quad (2)$$

where $X_{blend}$ is the content (in wt %) of units derived from monomer X in the blend of two polymer fractions A and B each having individual content (in wt %) of units derived from monomer X of $X_A$ and $X_B$, respectively; and $n_A$ and $n_B$ represent the weight fractions of polymer fractions A and B in the blend. With known monomer content for the blend and for the first fraction (e.g., component A in Equation (2)), and with known polysplit (i.e., wt % s of the first and second fractions in the blend), the monomer content of the second polymer fraction (e.g., component B in Equation (2)) may readily be calculated.

Additional Properties of the Multimodal Elastomer Compositions

The blends of some embodiments exhibit Mw (as determined by GPC with LS detector, as described previously) greater than 300,000 g/mol, preferably greater than 350,000 g/mol. For instance, Mw of the multimodal elastomer blends of some embodiments may range from 300,000-800,000, such as 300,000-600,000, preferably 350,000-550,000 g/mol. Mn(DRI) is preferably greater than 75,000 g/mol, such as within the range from 75,000-135,000, preferably 75,000-150,000. The Mw(LS) and Mn(DRI) of some very high viscosity blends according to some embodiments may be at the higher end of these ranges (e.g., Mw(LS) within the range from 450,000 to 600,000, such as 450,000 to 550,000 g/mol; Mn(DRI) within the range from 100,000 to 150,000, such as 110,000 to 125,000, with ranges from any foregoing low to any foregoing high also contemplated in various embodiments).

MWD (Mw(LS)/Mn(DRI)) preferably is at least 3, more preferably at least 4, such as within the range from 4-10, preferably 4-7, such as 4-6. In some preferred embodiments, MWD may be within the range from 4-5.5, such as 4-5 or 4.5-5. Ranges from any of the foregoing lows to any of the foregoing highs are also contemplated in various embodiments.

The blends' Mooney Large rotor Relaxation Area (MLRA), as measured at 150° C., may be at least 700 MU.sec, such as at least 800 MU.sec. MLRA/ML (also as measured at 150° C.) may be within the range of 5-20 sec. Preferably, MLRA/ML is at least 10 sec, such as within the range of 10-20, 10-15, or even 10-13 sec, with ranges from any of the foregoing lows to any of the foregoing highs also contemplated in various embodiments. For very high viscosity blends suited for sponge or foaming grades, MLRA/ML may be within the range of 11 to 20, such as 11 to 15, or even 11.5 to 14 sec, with ranges from any of the foregoing lows to any of the foregoing highs also contemplated in some embodiments.

Further, the blends of some embodiments may exhibit branching index of 5-15, preferably 6-10, as measured by a rubber process analyzer (RPA) at 150° C., 0.63 radian/sec., with 1000% oscillation amplitude. Very high viscosity blends, such as are suitable for sponge or foaming grades, may have branching index within the range from 3 to 7, such as 4 to 6, indicating slightly less branching for some such very high viscosity blend embodiments.

Very high viscosity blends may also exhibit one or more of the following properties: (i) tan(δ) at 11 rad/sec within the range from 0.3 to 0.5, such as from 0.4 to 0.47; (ii) dynamic viscosity η' (11 rad/sec) within the range from 10,000 to 15,000 cP, such as 11,000 to 14,000 cP, or 11,500 to 13,000 cP; (iii) dynamic viscosity η' (300 rad/sec, approximating extrusion shear rates) within the range from 400 to 700, such as 500 to 600; and (iv) Shear Thinning Ratio (STR) η' (11 rad/sec)/η' (300 rad/sec) within the range from 15 to 40, such as 20 to 30. In various embodiments, ranges from any of the foregoing low ends to any of the foregoing high ends for a given property are also contemplated.

Methods of Forming Multimodal Elastomer Compositions

The polymerization process employed preferably involves use of a Ziegler-Natta catalyst system. Such catalyst systems generally include both the catalyst (e.g., a Ziegler-Natta catalyst such as $VOCl_3$ or, more preferably, $VCl_4$) and one or more co-catalysts, also sometimes referred to as activators. Some suitable catalyst systems, and the catalysts and co-catalysts thereof, are described in Col. 3, lines 47-60 of U.S. Pat. No. 3,980,623, which description is incorporated herein by reference. Particularly suitable co-catalysts further include, to the extent not described in the '623 patent, diethyl aluminum chloride (DEAC), ethyl aluminum sesquichloride (EASC), and/or ethyl aluminum dichloride (EADC).

The polymerization process is preferably a solution polymerization process, employing an inert hydrocarbon solvent. Such solvents include any hydrocarbon liquid capable of acting as a dissolving agent for an elastomeric polymer. Preferably, the solvent comprises one or more hydrocarbon liquids having the formula $C_xH_y$, wherein x is 5 to 20, and y is 12 to 22, such as hexane, isohexane, pentane, iso-pentane, and cyclohexane.

Further, as noted, the multimodal elastomer compositions are preferably reactor blends, most preferably series reactor blends. Thus, some embodiments employ solution polymerization using two or more series polymerization reaction zones, preferably two series reaction zones, to produce multimodal elastomer compositions. According to such embodiments, a first plurality of monomers (ethylene, α-olefin, and polyene according to the discussion above) is fed to a first polymerization reaction zone R1, along with polymerization solvent and Ziegler-Natta catalyst system. These feed components may be mixed beforehand and fed together, fed separately, or fed in any desired sub-combination. Preferably, they are fed continuously to the first polymerization reaction zone R1, but batch polymerization processes are also within the scope of the invention. In addition, hydrogen gas may be supplied in small amounts to the first reaction zone R1 in order to control average chain length of the first polymer reaction product formed in reaction zone R1 by halting chain growth. Within the reaction zone R1, the monomers and catalyst system react to form a first polymer reaction process according to the well-documented Ziegler-Natta polymerization mechanism.

A first polymerization effluent (comprising the first polymer reaction product) is withdrawn from the first polymerization reaction zone R1 and fed to a second polymerization reaction zone R2. (It is at this point that a portion of the first polymerization effluent may be collected to enable direct measurement of the first polymer reaction product's properties, in accordance with the above descriptions of direct property measurement of a first polymer fraction in a series reactor blend.) According to some embodiments, additional monomers (comprising ethylene, α-olefins, and polyenes according to the previous discussion of suitable monomers for forming the multimodal elastomer compositions) may be fed, with or without additional solvent, to the second reaction zone R2 along with, or in addition to, the first polymerization effluent.

At this point, additional Ziegler-Natta catalyst system could also be supplied to the second reaction zone R2. However, it is preferred that no additional catalyst be supplied to the second reaction zone R2, so as to minimize the polymerization reactions taking place therein. In R2, some of the polymer chains of the first polymer reaction product will themselves copolymerize, resulting in significantly longer polymer chains created in the second polymerization reaction zone R2; however, this effect is minimized by providing no additional catalyst to the reaction zone R2. It may be further suppressed by supplying $NH_3$ to the second reaction zone R2. A second polymerization effluent is accordingly withdrawn from the second reaction zone R2, comprising first polymer reaction product and a relatively smaller amount of second polymer reaction product.

As is apparent, the first polymer reaction product, having shorter chain lengths and greater amount, corresponds to the first, low Mooney, polymer fraction of the elastomer composition of embodiments described above; the second polymer reaction product corresponds to the second, high Mooney, polymer fraction of the embodiments described above. Preferably, then, the polymerizations in each reaction zone R1 and R2 are controlled so as to obtain the elastomer composition having the above-described polysplits and Mooney viscosities, among other previously described properties.

It is further noted that the second polymerization effluent, comprising the first and second polymer reaction products (i.e., the multimodal elastomer composition), likely also contains a large amount of solvent, as well as some unreacted monomer and other byproducts (such as byproduct species derived from the Ziegler-Natta catalyst system during the polymerization reaction). Thus, processes of some embodiments further include removal of the solvent, monomers, and byproducts, including by devolatilization. Devolatilization according to some embodiments may include: (i) steam flashing the second polymerization effluent to remove solvent and any species dissolved therein, thereby forming a slurry comprising the multimodal elastomer composition and water (up to 95 wt % water, by weight of the slurry, in some embodiments); and (ii) removing the water from the slurry, which may comprise passing the slurry through an expander or expeller, followed by heat treatment. The resulting elastomer composition may then be further processed by formation into pellets or, preferably, bales. The elastomer composition (in pellet, bale, or other suitable form) may then be provided for further processing (e.g., formulation and formation into articles of manufacture), examples of which are described below.

Due to the advantages in compound processability achieved by the multimodal elastomer compositions of various embodiments, it is possible in many embodiments to omit the addition of extender oil, or to minimize its introduction, into elastomer compounds formed from the multimodal elastomer compositions. For instance, it is common practice to add extender oil to the raw polymer effluent (e.g., the second polymerization effluent per the above process description). However, processes according to these preferred embodiments omit that oil addition, thereby calling for providing the second polymerization effluent to a devolatilization process without adding oil (i.e., such that the second polymerization effluent is substantially free of extender oil when provided to the devolatilization process). Furthermore, no oil is added during the devolatilization process, such that the devolatilized elastomer composition (in bale, pellet, or other desired form for shipment and/or further processing into articles of manufacture) is substantially free of extender oil. Non-oil-extended elastomers of such embodiments (e.g., non-oil-extended EPDM) provide many advantages, including greater flexibility in downstream processing (e.g., by allowing downstream manufacturers complete control over any oils present in their end products, based only upon the process oil they add during downstream formulation and processing of the raw material EPDM). Further, the non-oil-extended elastomer composition maximizes the value (on a per weight basis) of the raw material elastomer purchased (as there is no extender oil adding weight to the raw material product elastomer).

Compounds Made from Multimodal Elastomer Compositions

The multimodal elastomer compositions (in whatever form, pellet, bale, or otherwise), as noted, may be formulated and/or processed with any one or more various additives (e.g., curatives or cross-linking agents, fillers, process oils, and the like) to form elastomer compounds suitable for making articles of manufacture. For instance, compounds according to some such embodiments include, in addition to the elastomeric composition, any components suitable for an EPDM formulation. For example, any of various known additives (fillers, plasticizers, compatibilizers, cross-linkers, and the like) may be formulated with the multimodal elastomer compositions of certain embodiments, providing an elastomeric compound or elastomeric formulation.

Where curatives, i.e., cross-linking agents or vulcanizing agents, are utilized, the multimodal elastomer composition may be present in the elastomeric compound in at least partially cross-linked form (that is, at least a portion of the polymer chains of the devolatilized elastomer composition are cross-linked with each other, e.g., as a result of a curing process typical for EPDM rubbers). Accordingly, particular embodiments provide for an at least partially cross-linked elastomeric compound made by mixing a formulation comprising: (a) a multimodal elastomer composition (e.g., in accordance with any of the above-described embodiments); (b) one or more vulcanization activators; (c) one or more vulcanizing agents; and (d) optionally, one or more further additives.

Suitable vulcanization activators include one or more of zinc oxide, stearic acid, and the like. These activators may be mixed in amounts ranging from about 0 to 20 phr. As used herein, "phr" means parts per hundred parts rubber, where the "rubber" is taken as the elastomer composition. Thus, for activator to be formulated with elastomer composition at 15 phr, one would add 15 g activator to 100 g rubber. Unless specified otherwise, phr should be taken as phr on a weight basis. Different vulcanization activators may be employed in different amounts. For instance, where the vulcanization activator includes zinc oxide, the zinc oxide may be employed at amounts ranging from 1 to 20 phr, such as 2.5 to 10 phr (e.g., about 5 phr), while stearic acid may preferably be employed in amounts ranging from 0.1 to 5 phr, such as 0.1 to 2.0 phr (e.g., about 1.5 phr), with ranges from any of the foregoing lows to any of the foregoing highs also contemplated in various embodiments.

Any vulcanizing agent known in the art may be used. Of particular note are curing agents as described in Col. 19, line 35 to Col. 20, line 30 of U.S. Pat. No. 7,915,354, which description is hereby incorporated by reference (e.g., sulfur, peroxide-based curing agents, resin curing agents, silanes, and hydrosilane curing agents). Other examples include phenolic resin curing agents (e.g., as described in U.S. Pat. No. 5,750,625, also incorporated by reference herein). Cure co-agents may also be employed (e.g., as described in the already-incorporated description of U.S. Pat. No. 7,915,354).

The further additives (used in any compound and/or in an at least partially cross-linked elastomeric compound according to various embodiments) may be chosen from any known additives useful for EPDM formulations, and include, among others, one or more of:

Process oil, such as paraffinic process oil (examples including Sunpar™ 2280 (available from HollyFrontier Refining & Marketing LLC, Tulsa, Okla.); as well as Flexon™ 876, CORE™ 600 base stock oil, Flexon™ 815, and CORE™ 2500 base stock oil, available from ExxonMobil Chemical Company, Baytown, Tex.; process oil may be present in the formulation at 1-150 phr, such as 50-100, or 60-80 phr (when present), or, for sponge grades, within the range from 50-200 phr, such as 70-150, or 80-100 phr (with ranges from any of the foregoing lows to any of the foregoing highs also contemplated), and preferred process oils have viscosity at 40° C. ranging from 80 to 600 CSt;

Vulcanization accelerators, present in the formulation at 0 to 15 phr, such as 1-5, or 2-4 phr, with examples including thiazoles such as 2-mercaptobenzothiazole or mercaptobenzothiazyl disulfide (MBTS); guanidines such as diphenylguanidine; sulfenamides such as N-cyclohexylbenzothiazolsulfenamide; dithiocarbamates such as zinc dimethyl dithiocarbamate, zinc diethyl dithiocarbamate, zinc dibenzyl dithiocarbamate (ZBEC); and zincdibutyldithiocarbamate, thioureas such as 1,3-diethylthiourea, thiophosphates and others;

Processing aids (e.g., polyethylene glycol or zinc soap);

Carbon black (e.g., having particle size from 20 nm to 600 nm and structure having DBPA (dibutyl phthalate absorption number) within the range from 0 to 150, as measured by the DBP method described in ASTM D2414), which may be present in the formulation at 0-500 phr, preferably 0-200 phr, such as within the range of 50-150 phr, with ranges from any of the foregoing lows to any of the foregoing highs also contemplated in various embodiments;

Mineral fillers (talc, calcium carbonate, clay, silica, aluminum trihydrate, and the like), which may be present in the formulation from 0 to 200 phr, preferably from 20 to 100 phr, such as in the range of 30 to 60 phr, with ranges from any of the foregoing lows to any of the foregoing highs also contemplated in various embodiments;

Sponge or foaming grade additives, such as foaming agent or blowing agent, particularly in very high Mooney viscosity embodiments, such as those suitable for sponge grades. Foaming or blowing agents may be of chemical nature (such that they liberate a gas by decomposition), and one or more foaming or blowing agents may be used in combination. Examples of such agents include: azodicarbonamide (ADC), ortho-benzo sulfonyl hydrazide (OBSH), p-toluenesulfonylhydrazide (TSH), 5-phenyltetrazole (5-PT), and sodium bicarbonate in citric acid. Microcapsules may also or instead be used for such foaming applications. These may include a thermo-expandable microsphere comprising a polymer shell with a propellant contained therein. Examples are known in the art and described in, for example, U.S. Pat. Nos. 6,582,633 and 3,615,972; PCT Publication Nos. WO 99/46320 and WO 99/43758, and contents of which hereby are incorporated by reference. Examples of such thermo-expandable microsphere include, for example, EXPANCEL™ products commercially available from Akzo Nobel N.V., and ADVANCELL products available from Sekisui. In other embodiments, sponging or foaming may be accomplished by direct injection of gas and/or liquid (e.g., water, $CO_2$, $N_2$) into the rubber in an extruder, for foaming after passing the composition through a die; and Various other additives may also be included, such as antioxidants, stabilizers, anticorrosion agents, UV absorbers, antistatics, slip agents, moisture absorbants (e.g., calcium oxide), and pigments, dyes, and other colorants.

As noted, the at least partially cross-linked elastomeric compounds of some embodiments are formed by mixing the above-described formulations. Mixing in these embodiments may include any one or more of typical mixing processes for EPDM compositions, such as open mill mixing, mixing using internal mixers or kneaders, and extrusion (e.g., through a twin-screw extruder).

At least partially cross-linked foamed elastomeric articles of some embodiments are formed by molding or extrusion. The molded articles can be made in a partly-filled mold, to have an expansion and curing in the mold at suitable temperatures (e.g., between 150 and 220° C., depending on nature of the foaming or blowing agent). Or, foamed articles may be made in an overfilled mold, with curing being made in two (or more) passes, pre-curing in the mold at pre-cure temperatures (e.g., 140 to 170° C.), expansion out of the mold to obtain a part of very low density (e.g., specific gravity of 0.4 g/cc or less, such as 0.3 g/cc or less), finished by a post-curing in hot air (at temperature of, e.g., 150 to 200° C.), to stabilize the foamed rubber matrix. Sponge profiles used, for example, in auto sealing systems (door, trunk) may be produced by extrusion, followed by a continuous vulcanization equipment such as a microwave oven and/or hot air oven at elevated temperatures (e.g., 200 to 300° C.), or a salt bath or glass bead fluid bed, for transferring heat to the rubber profile, creating an expansion by blow agent decomposition, coinciding with the rubber vulcanization itself, such that a controlled cell morphology is obtained in the foamed article.

As previously discussed, formulations comprising the multimodal elastomer compositions of various embodiments surprisingly exhibit much lower viscosity than would be expected given the high Mooney viscosity of the multimodal elastomer compositions themselves. This means that the formulation comprising such multimodal elastomer compositions are much more easily processed than one might typically expect; and furthermore retain the benefits (e.g., in mechanical strength and elasticity) of inclusion of the higher Mooney elastomeric composition.

One means of quantifying this phenomenon is by measuring the Mooney viscosity of the compound formed by mixing the formulations (referred to herein as "compound Mooney viscosity" or "compound ML"), and dividing such compound Mooney viscosity with the measured Mooney viscosity of the multimodal elastomer composition itself, giving the ratio compound Mooney viscosity to elastomer composition Mooney viscosity (which may be referred to in the shorthand as "Cpd Mooney/Elast Mooney"). It should be noted that the compound Mooney is determined according to the previously-described Mooney viscosity measurement procedure; however, rather than using 8-minute runtime at 150° C. for the viscosity test, the compound viscosity test uses 4-minute runtime at 100° C. This is because running the Mooney test on the compound at higher temperatures risks causing further cross-linking reactions (due, e.g., to the inclusion of vulcanizing agent in the formulation from which the compound is formed). Furthermore, the viscosity measurements for the compound have leveled out by 4 minutes; there is no need to continue the test for an additional 4 minutes. Thus, compound Mooney viscosities are reported as (ML, 1+4@100° C.). Therefore, any comparison between one elastomer's Cpd Mooney/Elast Mooney ratio and another elastomer's Cpd Mooney/Elast Mooney ratio should ensure consistent procedures used for measuring (i) Mooney viscosity of the compound, and, separately, (ii) Mooney viscosity of the elastomer alone. In addition, it is preferred that the same formulation be used for each elastomer being compared, when forming the compound from each respective elastomer being compared.

The Cpd Mooney/Elast Mooney for multimodal elastomer compositions of certain embodiments ranges from 1.0 to 1.3, preferably 1.0 to 1.1, most preferably from 1.0 to 1.09, with ranges from any of the foregoing lows to any of the foregoing highs also contemplated in various embodiments. In such embodiments, the compound Mooney may be within the range from 80 to 100 MU (ML, 1+4 at 100° C.), or within the range from 85 to 95 MU (ML, 1+4 at 100° C.), with ranges from any one of the foregoing lows to any one of the foregoing highs also contemplated.

In yet other embodiments, particularly those in which the elastomer compound has more process oil and/or other process aids (e.g., polyethylene glycol) added into it (as might be the case, e.g., for sponge grade formulations), the Cpd Mooney/Elast Mooney may be an even lower number (owing to the additional viscosity-reducing effect of the greater amount of process oil). For instance, such embodiments may have Cpd Mooney/Elast Mooney within the range from 0.25 to 0.60, such as from 0.25 to 0.35, or from 0.30 to 0.40, such as from 0.30 to 0.39, with ranges from any of the foregoing lows to any of the foregoing highs also contemplated in various embodiments. The compound Mooney of such embodiments may be within the range from 30 to 60 MU, such as 35 to 55 MU, or 40 to 50 MU (ML, 1+4 at 100° C.), with ranges from any one of the foregoing low ends to any one of the foregoing high ends also contemplated in various embodiments, The Cpd Mooney/Elast Mooney ratio for the multimodal elastomer compositions of some of these embodiments may be lower than the comparable Cpd Mooney/Elast Mooney ratio for conventional, lower viscosity polymer compositions that differ from the inventive elastomer compositions in one or more of MLRA (or MSTRA, as applicable), branching index, and MWD. Such differences may also be accounted for in different relative wt % s of first and second polymer fractions, as well as different Mooney Viscosities of each fraction as between the comparative elastomer composition and the inventive elastomer composition. This lower Cpd Mooney/Elast Mooney ratio indicates a relatively minor increase in viscosity for the compound vs. the polymer viscosity increase, which enables much easier processing (e.g., mixing to form compounds and/or molding to form a shaped article from such compounds, according to certain embodiments) than one would otherwise expect in view of the higher viscosity of the inventive elastomer compositions of such embodiments.

EXAMPLES

Example 1

Inventive Samples 1-8 are reactor blend EPDM terpolymers that were produced according to the following dual series reactor polymerization process. The feed included diluent hexane, ethylene monomers, propylene monomers, ENB monomers, $VCl_4$ catalyst/ethyl aluminum sesquichloride (EASC) co-catalyst, hydrogen gas, and ammonia. A first effluent (containing R1 polymer product in addition to unreacted monomers, catalyst, and co-catalyst) was continuously withdrawn from reactor R1. Most of the first effluent was continuously fed to a second polymerization reactor R2 at a rate that maintained the process at steady state operation, although some of the first effluent was periodically collected for analysis of the R1 polymer product (e.g., monomer content and viscosity). Additional ethylene, propylene, and ENB monomer in hexane solvent were continuously fed to the second reactor R2 in addition to the first effluent. A second effluent was drawn from the second reactor R2, comprising R1 polymer product (the first polymer fraction) and R2 polymer product (the second polymer fraction) in hexane solvent, unreacted monomers, and trace amounts of vanadium.

The molecular weights and MWD (Mw(LS)/Mn(DRI)) for each of the sample EPDM reactor blends 1-8 are summarized in Table 1, along with the same properties for comparative sample C9, which corresponds to Vistalon 7500, a bimodal Ziegler-Natta catalyzed EPDM rubber, available from ExxonMobil Chemical Company in Baytown, Tex. Samples 1-8, in contrast, are of higher molecular weight, and furthermore contained no extender oil to reduce the higher apparent polymer viscosity.

TABLE 1

Sample Monomer Contents

| Sample No. | Mn (DRI) | Mw (LS) | Mw(LS)/Mn(DRI) |
|---|---|---|---|
| 1 | 90680 | 393949 | 4.34 |
| 2 | 81981 | 356244 | 4.35 |
| 3 | 88910 | 388230 | 4.37 |
| 4 | 79336 | 390094 | 4.92 |
| 5 | 91320 | 386782 | 4.24 |
| 6 | 91836 | 406429 | 4.43 |
| 7 | 103151 | 424238 | 4.11 |
| 8 | 86927 | 389480 | 4.48 |
| C9 | 82007 | 357734 | 4.36 |

In addition, Mooney viscosity and relaxation data are reported in Table 2 for each of inventive samples 1-8, as well as for comparative sample C9. Interestingly, as shown in Table 2, the ratio of Mooney viscosity determined using ML rotors at 150° C. to 125° C. is consistently about 0.73, indicating a good conversion factor to use for converting between (ML, 1+8@150° C.) and (ML, 1+8@125° C.) for the polymers of these samples.

TABLE 2

Sample Mooney Viscosity Data

| Sample No. | ML, 1 + 8 @150° C. | MLRA/ML (1 + 8 @ 150° C.) | ML, 1 + 8 @125° C. | ML (150° C.)/ ML (125° C.) |
|---|---|---|---|---|
| 1 | 79.2 | 11.1 | 108.8 | 0.73 |
| 2 | 71.4 | 10.3 | 97.9 | 0.73 |
| 3 | 75.1 | 10.7 | 102.2 | 0.73 |
| 4 | 82.8 | 11.6 | 113.6 | 0.73 |
| 5 | 82.0 | 11.4 | 111.6 | 0.73 |
| 6 | 82.8 | 11.4 | 115.0 | 0.72 |
| 7 | 82.6 | 11.1 | 113.5 | 0.73 |
| 8 | 82.2 | 11.2 | 112.9 | 0.73 |
| C9 | 61.8 | 9.9 | 84.9 | 0.73 |

Furthermore, polysplit, monomer contents, and ML values are reported for blends 4-5 in Table 3a, and reported for blends 6-8 in Table 3b. It is noted that Samples 4 and 5 had the same polysplit, monomer contents, and ML values; as did Samples 6-8. In Tables 3a and 3b, R1 indicates the Mooney viscosity or monomer content (as applicable) measured directly for R1 polymer reactor product, and R1+R2 indicates the Mooney viscosity or monomer content measured directly for the reactor blend that exited the second reactor R2. R2 values are calculated from the measured R1 and R1+R2 values, as described previously herein.

TABLE 3a

Polymer Fraction Polysplit, Monomer Contents, and Mooney Viscosity

| MU (ML, 1 + 8@150° C.) | C2 % | ENB % |
|---|---|---|
| Reactor 1 | | |
| 72 | 55.8 | 7.1 |
| Reactor 2 | | |
| 256 | 58.9 | 8.3 |
| Reactor 1 + 2 | | |
| 82 | 56.1 | 7.3 |

TABLE 3b

Polymer Fraction Polysplit, Monomer Content, and Mooney Viscosity

| MU (ML, 1 + 8@150° C.) | C2 % | ENB % |
|---|---|---|
| Reactor 1 | | |
| 69.5 | 55 | 6.79 |
| Reactor 2 | | |
| 308 | 58.6 | 8.1 |
| Reactor 1 + 2 | | |
| 82 | 55.4 | 6.94 |

As can be seen in Tables 1-2, the EPDM compositions of Samples 1-8 all exhibited higher Mooney viscosity than the reference commercial bimodal rubber. In addition, the compositions of Samples 1-8 exhibit consistently higher MLRA/ML, indicating a broader molecular weight distribution in the blend.

Example 2

Samples 5-8 were formulated with additional components according to Table 4 below, as was comparative Sample C9.

TABLE 4

Formulations for Some Samples

| | | phr |
|---|---|---|
| First Pass | Polymer | 100 |
| | N-550 FEF | 130 |
| | Flexon™ 876 | 70 |
| | Stearic Acid | 1 |
| | ZnO (red seal) | 5 |
| | Sulfur | 0.1 |
| Second Pass | Sulfur | 1 |
| | ZBEC (70%) | 1.5 |
| | MBTS (80%) | 1.5 |
| | Rhenocure™ ZAT (70%) | 1.1 |
| | Rhenocure™ TP/G (50%) | 1.8 |

In Table 4, "polymer" indicates the respective Sample included in the formulation; N-550 FEF is a carbon black (pellet form); Flexon™ 876 is a paraffinic process oil with viscosity of 110 CSt at 40° C.; Stearic Acid and ZnO (zinc oxide) are vulcanization activators; sulfur is a curing agent; ZBEC (zinc dibenzyl dithiocarbamate) and MBTS (mercaptobenzothiazyl disulfide) are each vulcanization activators; Rhenocure ZAT is zinc amino dialkyl dithiophosphate (70% concentration active material, pellets in binder), available from Lanxess Corporation, Pittsburgh, Pa.; and Rhenocure TP/G is zinc dibutyldithiophosphate, also available from Lanxess Corporation, Pittsburgh, Pa. The formulation is considered a typical useful formulation for EPDM compounds, and therefore is taken as useful for testing the processability of Samples 5-8 as compared to conventional Sample C9.

The formulation was mixed according to the following procedure, to form an elastomeric compound. Polymer and other components in the "First Pass" section of Table 4 were added to a 1600 cc Banbury-type tangential internal mixer (available from Farrel Corporation) at 0'00" and 0'30", respectively, and operation of the mixer carried out for 3 minutes as shown in Table 5 below for "First Pass" parameters (specifically, operation at 90 RPM, 70° C.). The ram was then raised up, mixing continued for 15 more seconds, and the "First Pass" components were dumped and milled in a 2-roll mill. The mixed and milled "First Pass" components were allowed to cool. Then, the cooled "First Pass" components and the "Second Pass" components of Table 4 were added to the mixer, and operation of the mixer proceeded for 1 additional minute with the "Second Pass" parameters in Table 5 (70 RPM, 30° C.). After the 1-minute second pass, the mixed compound was dumped, milled, and allowed to cool, then collected for further analysis/rheology testing (uncured), and press cured at 180° C. to form an at least partially cured compound (which is suitable for evaluating mechanical and set properties).

TABLE 5

Mixer Operation for Example 2 Compound Formation
Upside Down - 2 pass
Farrel mixer - NCV 1600 cc - Banbury type
Loading: 70% NCV
Ram pressure: 2 kg
Rotor speed: 90 RPM (First Pass)/70 RPM (Second Pass)
Mixer start temperature: ±70° C. (First Pass)/30° C. (Second Pass)
Mixing time: 3'15" (First Pass)/1' (Second Pass)

| Time: | Action: |
|---|---|
| 0'00" | Add Polymer, ram down |
| 0'30" | Add remaining "first pass" components sweep at 90° C. sweep at 105° C. |
| 3'00" | Ram up |
| 3'15" | Dump |

The conditions observed during the processing of Example 2 compounds were recorded and are summarized in Table 6. As indicated in Table 6, the power employed for mixing the formulations containing Samples 5-8, and the temperatures encountered during such processing, compared quite favorably with the power usage and temperatures encountered during processing of the conventional Sample C9. This indicates that the higher Mooney viscosity of the Samples 5-8 did not detrimentally impact ability to process the formulation containing those Samples. In addition, Table 6 shows the qualitative observations of the compounded formulation's behavior after mixing and milling, as applicable. All produced compounds behaved acceptably in the mixing process.

TABLE 6

Conditions of Processing Formulations

| | Sample No. | | | | |
|---|---|---|---|---|---|
| | 5 | 6 | 7 | 8 | C9 |
| Start temperature (° C.) | 69 | 70 | 70 | 70 | 70 |
| Sweep time at 90° C. (min) | 1'05" | 1'05" | 1'03" | 1'04" | 1'09" |
| Sweep time at 105° C. (min) | 1'26" | 1'22" | 1'23" | 1'23" | 1'31" |
| Ram up temperature after 3'00" (° C.) | 135 | 142 | 139 | 142 | 136 |
| Dump temperature after 3'15" (° C.) | 157 | 157 | 154 | 158 | 152 |
| Energy Consumption (Wh) | 232 | 244 | 245 | 240 | 233 |
| Dump behavior (First Pass) | OK | OK | OK | OK | OK |
| Milling behaviour (First Pass) | OK | OK | OK | OK | OK |
| Milling behaviour (Second Pass) | OK | OK | OK | OK | OK |

Example 3

Compound Mooney viscosity for each of Samples 6, 7, and 8, as well as comparative Sample C9, was determined according to the Mooney viscosity determination procedures outlined above. These values are reported in Table 7 below, along with reproduction of the Mooney viscosity values previously determined and reported for the elastomer composition Samples 6, 7, 8, and C9.

TABLE 7

Compound Mooney Viscosity and Elastomer Viscosity

| | Sample: | | | |
|---|---|---|---|---|
| | C9 | 6 | 7 | 8 |
| Elastomer Mooney viscosity (MU) | | | | |
| ML 1 + 8, 150° C. | 62 | 84 | 83 | 82 |
| Compound Mooney | | | | |
| MU (ML, 1 + 4@100° C.) | 75 | 89 | 88 | 89 |
| Cpd Mooney/Elast Mooney | 1.20 | 1.06 | 1.06 | 1.08 |

As shown in Table 7, the inventive Samples 6-8 each showed significantly lower values for the ratio Compound Mooney/Elastomer Mooney than did the conventional C9 elastomer. This means that the detrimental effects to processing normally expected for elastomers with the significantly higher Mooney viscosities of Samples 6-8 are significantly dampened by use of the inventive elastomer compositions in a compounding formulation, as such elastomers result in formulations with a surprisingly lower than expected viscosity.

Example 4

Inventive Samples 11-12 are reactor blend EPDM terpolymers that were produced according to the same dual series reactor polymerization process outlined in connection with Example 1, except that the polymerization was controlled to obtain higher Mooney viscosity (longer average chain length) in the polymer product of the first polymerization reactor R1, such that the terpolymers are suitable for use in, e.g., sponge grades. Samples 11 and 12 contain no extender oil. Table 8 shows molecular weights and MWD (Mw(LS)/Mn(DRI)) for each of the sample EPDM reactor blends 11 and 12, along with the same properties for comparative sample C10, which corresponds to Vistalon™ 8600 sponge grade EPDM, available from ExxonMobil Chemical Company in Baytown, Tex.

TABLE 8

Sample Monomer Contents, Example 4

| Sample No. | Mn (DRI) | Mw (LS) | Mw(LS)/Mn(DRI) |
|---|---|---|---|
| 11 | 119016 | 486120 | 4.34 |
| 12 | 116989 | 516166 | 4.35 |
| C10 | 73859 | 379718 | 4.36 |

In addition, Mooney viscosity and relaxation data, as well as branching index BI determined by the LAOS measurement methods outlined above, are reported in Table 9a for each of Inventive Samples 11 and 12, as well as for Comparative Sample C10. As shown in Table 9a, the ratio of Mooney viscosity determined using ML rotors at 150 to 125° C. averages to 0.685 for the inventive samples, indicating a good conversion factor to use for converting between (ML, 1+8@150° C.) and (ML, 1+8@125° C.) for the polymers of these samples. Interestingly, the ratio of Mooney viscosity determined using ML rotors at 150 to 125° C. for the C10 comparative sample is 0.72, similar to the 0.73 consistently seen for such a conversion in connection with Samples 1-8 and C9. The difference could be due to the extremely high Mooney viscosity obtained in Samples 11 and 12. As can be seen in Tables 8 and 9, the EPDM compositions of Samples 11 and 12 all exhibited higher Mooney viscosity than the reference commercial sponge grade bimodal rubber. In addition, the compositions of Samples 11 and 12 exhibit higher MLRA/ML, indicating a broader molecular weight distribution in those blends.

TABLE 9a

Sample Mooney Viscosity Data, Example 4

| Sample No. | ML, 1 + 8@150° C. | MLRA (150° C.) | MLRA/ML (1 + 8) @ 150° C.) | ML, 1 + 8 @125° C. | ML(150° C.)/ ML(125° C.) | BI (LAOS, 150° C.) |
|---|---|---|---|---|---|---|
| 11 | 92 | 1110 | 11.3 | 135 | 0.68 | 5.7 |
| 12 | 94 | 1120 | 12 | 135 | 0.69 | 5.8 |
| C10 | 60 | 630 | 10.5 | 84 | 0.72 | 8.3 |

In addition, Table 9b reports some sample dynamic properties obtained using the RPA at 125° C. and using the indicated shear rates, as described previously.

TABLE 9b

Dynamic Properties

| Sample No. | Tan(δ) (11 rad/s) | Dynamic Viscosity η' (11 rad/s), Pa * s | η' (300 rad/s), Pa * s | η' ratio (11 rad/s)/(300 rad/s) |
|---|---|---|---|---|
| 11 | 0.44 | 12480 | 523 | 24 |
| 12 | 0.45 | 12580 | 526 | 24 |
| C10 | 0.53 | 10520 | 515 | 20 |

Sample 11 and 12's lower tan(δ) values and higher dynamic viscosity values at low shear, as compared to C10, indicate that these samples are more elastic molecules at low shear, providing collapse resistance. Furthermore, the larger η' ratio of these samples indicates a greater degree of shear thinning, which benefits extrusion performance, particularly in soft profiles (e.g., such as a foam or sponge grade).

Furthermore, polysplit, monomer contents, and ML values are reported for Sample 11 and 12 in Tables 10a and 10b. In Tables 10a and 10b, R1 values indicate the Mooney viscosity or monomer content (as applicable) measured directly for R1 polymer reactor product, and R1+R2 indicates the Mooney viscosity or monomer content measured directly for the reactor blend that exited the second reactor R2. R2 values are calculated from the measured R1 and R1+R2 values, as described previously herein.

TABLE 10a

Sample 11 Polysplit, Monomer Contents, and Mooney Viscosity

| MU (ML, 1 + 8@150° C.) | C2 % | ENB % |
|---|---|---|
| R1 | | |
| 84.0 | 56.2 | 8.8 |

TABLE 10a-continued

Sample 11 Polysplit, Monomer Contents, and Mooney Viscosity

| MU (ML, 1 + 8@150° C.) | C2 % | ENB % |
|---|---|---|
| R2 | | |
| 274 | 68.8 | 10.5 |
| R1 + R2 | | |
| 94 | 57.4 | 9.0 |

TABLE 10b

Sample 12 Polysplit, Monomer Contents, and Mooney Viscosity

| MU (ML, 1 + 8@150° C.) | C2 % | ENB % |
|---|---|---|
| R1 | | |
| 82.0 | 56.0 | 8.9 |
| R2 | | |
| 283 | 68.6 | 10.6 |
| R1 + R2 | | |
| 92 | 57.2 | 9.07 |

Example 5

Samples 11 and 12 were formulated with additional components according to Table 11 below, as was comparative Sample C10.

TABLE 11

Formulations for Samples C10, 11, and 12

| | | phr |
|---|---|---|
| First Pass | Polymer | 100 |
| | N-550 FEF | 80 |
| | CaCO₃ mya BL | 30 |
| | Flexon ™ 815 | 90 |
| | Stearic Acid | 1.5 |
| | ZnO (red seal) | 4 |
| | PolyEthyleneGlycol 3350 | 0.1 |
| Second Pass | Calcium Oxide 80% | 2 |
| | Sulfur 80% | 1.5 |
| | MBTS (80%) | 1.2 |
| | ZBEC (70%) | 1.2 |
| | Rhenocure ™ ZAT (70%) | 1.5 |
| | Rhenocure ™ TP/G (50%) | 1.7 |
| | Vulkalent E | 0.2 |
| | Celogen OT OBSH | 2 |
| | Porofor ADC-L C2 | 2 |

In Table 11, "polymer" indicates the respective Sample (11, 12, or C9) included in the formulation. N-550 FEF, Stearic Acid, ZnO, sulfur, ZBEC, MBTS, Rhenocure™ ZAT and Rhenocure™ TP/G were previously identified and described in connection with Example 2, Table 4. Flexon™ 815 is a paraffinic oil with a viscosity of 490 CSt at 40° C., available from ExxonMobil Chemical Company; CaCO3 is a calcium carbonate available as Omya BL; PolyEthyleneGlycol 3350 is a poly(ethylene glycol), which serves as a process aid in the compound; Calcium Oxide 80% is an absorber of humidity contained in the filler; Vulkalent E is a benzene sulfonamide derivative used as a retarder of the curing system to prevent scorch; Celogen OT is OBSH, a foaming agent that decomposes at low temperature, creating small and closed cells; and Azodicarbonamide Profor ADC-L C2 is ADC, another foaming agent, which decomposes at higher temperature, creating large and open cells. The formulation is suitable for foaming, and therefore is taken as useful for testing the processability of Samples 11 and 12 as compared to conventional sample C10.

The formulation was mixed according to the following procedure, to form a foamed elastomeric article. Fillers, process oil, and additives in the "First Pass" section of Table 11 were added to a 1600 cc Banbury-type tangential internal mixer (available from Farrel Corporation) at 0'00" and polymer added at 0'30", with operation of the mixer carried out for 4 minutes as shown in Table 12 below for "First Pass" parameters (specifically, operation with rotor speed of 90 RPM, 70° C. starting temperature, going up to 135° C.). The ram was then raised up, mixing continued for 15 more seconds, and the "First Pass" components were dumped and milled in a 2-roll mill. The mixed and milled "First Pass" components were allowed to cool. Then, the cooled "First Pass" components and the "Second Pass" components of Table 11 were added to the mixer, and operation of the mixer proceeded for 2 additional minutes with the "Second Pass" parameters in Table 12 (70 RPM, 30° C.). After the 2-minute second pass, the mixed compound was dumped, milled, and allowed to cool, then collected for further analysis/rheology testing (uncured), and press cured at 180° C. to form an at least partially cured and foamed compound (which is suitable for evaluating mechanical and set properties).

TABLE 12

Mixer Operation for Example 5 Foam Article Formation
Upside Down - 2 pass
Farrel mixer - NCV 1600 cc - Banbury type
Loading: 71% NCV
Ram pressure: 2 kg
Rotor speed: 90 RPM (First Pass)/70 RPM (Second Pass)
Mixer start temperature: ±70° C. (First Pass)/30° C. (Second Pass)
Mixing time: 4'15" (First Pass)/2' (Second Pass)

| Time: | Action: |
|---|---|
| 0'00" | Add fillers, oil, additives |
| 0'30" | Add polymer, ram down sweep at 100° C. |
| 4'00" | Ram up |
| 4'15" | Dump |

The conditions observed during the processing of Example 5 compounds were recorded and are summarized in Table 13. As indicated in Table 13, the power employed for mixing the formulations containing Samples 11 and 12, and the temperatures encountered during such processing, compared quite favorably with the power usage and temperatures encountered during processing of the conventional Sample C10. This indicates that the higher Mooney viscosity of the Samples 11 and 12 did not detrimentally impact ability to process the formulation containing those Samples. Just the rotor speed was reduced from 90 rpm to 70 rpm after 3 minutes of mixing, to control the temperature increase and allow enough time (4 minute cycle) for consistent mixing. In addition, Table 13 shows the qualitative observations of the compounded formulation's behavior after mixing and milling, as applicable. All produced compounds behaved acceptably in the mixing process. This is particularly surprising given that the polymers of Samples 11 and 12 had significantly higher viscosity than did C10.

TABLE 13

Conditions of Processing Formulations

| | Sample No. | | |
|---|---|---|---|
| | C10 | 11 | 12 |
| Start temperature (° C.) | 69 | 70 | 70 |
| Sweep time at 100° C. (min) | 1'28" | 1'20" | 1'21" |
| Rotor speed reduction time from 90 to 70 rpm (min) | — | 2'20" | 3'25" |
| Ram up temperature after 4'00" (° C.) | 135 | 138 | 145 |
| Dump temperature after 4'15" (° C.) | 134 | 135 | 138 |
| Energy Consumption (Wh) | 217 | 211 | 233 |
| Dump behavior MB | OK | OK | OK |

Example 6

Compound Mooney viscosity for each of Samples 11 and 12, as well as comparative Sample C10, was determined according to the Mooney viscosity determination procedures outlined above. These values are reported in Table 14 below, along with reproduction of the Mooney viscosity values previously determined and reported for the elastomer composition Samples C10, 11, and 12. In addition, Table 14 illustrates curing properties. MDR in Table 14 indicates use of a Moving Die Rheometer from Alpha Technology; this device measures according to a die oscillating with an arc +/0 0.5 at a temperature of 180° C. properties such as the main momentum of the rubber vulcanization (e.g., minimum Mooney viscosity (ML), the torque obtained after full curing reaction (MH). MH-ML indicates the cure state of the compound; Ts2 indicates the time to reach 2 dN·m torque points above the minimum, and is the scorch time after which the rubber cannot be processed anymore. T90 is the optimum cure time, corresponding to the time necessary to reach 90% of the maximum cure state, and Rh in dNm/min is the cure rate corresponding to the speed of vulcanization between minimum and maximum torque. From these data, it is observed that Samples 11 and 12 have a similar cure state as the sample C10, but such cure state was obtained in a shorter time, as indicated by the shorter scorch time Ts2 and the faster cure rate (Rh). It is measured according to ASTM D5289.

TABLE 14

Compound Mooney Viscosity and Elastomer Viscosity

| | Sample: | | |
|---|---|---|---|
| | C10 | 11 | 12 |
| Elastomer Mooney viscosity (MU) | | | |
| ML 1 + 8, 150° C. | 60.2 | 91.8 | 93.7 |
| Compound Mooney | | | |
| MU (ML, 1 + 4@100° C.) | 34 | 45 | 46 |
| Cpd Mooney/Elast Mooney | 0.4 | 0.34 | 0.34 |

TABLE 14-continued

Compound Mooney Viscosity and Elastomer Viscosity

|  |  | Sample: | | |
| --- | --- | --- | --- | --- |
|  |  | C10 | 11 | 12 |
| Curing Properties | MDR arc +/−0.5, 180° C. | | | |
| MH-ML (dNm) | Cure state | 12.2 | 12.3 | 12.2 |
| Ts2 (min) | Scorch time | 0.40 | 0.36 | 0.37 |
| T90 (min) | Cure time | 2.7 | 2.5 | 2.5 |
| Rh (dNm/min) | cure rate | 12.3 | 13.9 | 13.8 |

As shown in Table 14, the Inventive Samples 11 and 12 each showed significantly lower values for the ratio Compound Mooney/Elastomer Mooney than did the conventional C10 elastomer. This means that the detrimental effects to processing normally expected for elastomers with the significantly higher Mooney viscosities of Samples 11 and 12 are significantly dampened by use of the inventive elastomer compositions in a compounding formulation, as such elastomers result in formulations with a surprisingly lower than expected viscosity.

Finally, Table 15 below illustrates various physical properties for the press cured compounds formed in Example 5. This illustrates that foamed articles made from the inventive elastomers exhibit superior tensile strength and green tear, while not suffering from detrimental effects to their cure set.

TABLE 15

Physical Properties for Press Cured Compounds

|  | Sample: | | |
| --- | --- | --- | --- |
|  | C | 1 | 2 |
| Hardness (ASTM D2240) | 52/50 | 53/52 | 53/52 |
| Modulus 100% (MPa) (ASTM D412) | 2.0 | 2.1 | 2.0 |
| Modulus 300% (MPa) | 6.2 | 6.8 | 6.3 |
| Tensile Strength (MPa) | 8.3 | 8.9 | 9.0 |
| Elongation at break (%) | 380 | 360 | 380 |
| Green Tear (ASTM D624 Die C) | | | |
| Max. force (KN/m) | 3.2 | 3.7 | 3.7 |
| Compression set (cure buttons 8 min at 180° C.) | 25% deflection (ASTM D395-B) | | |
| 7 days 70° C. (%) | 31 | 30 | 33 |
| 22 hours −20° C. (%) | 39 | 41 | 39 |

Green Tear row: uncured pad

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention. All documents described herein are incorporated by reference herein, including any priority documents and/or testing procedures to the extent they are not inconsistent with this text. Likewise, the term "comprising" is considered synonymous with the term "including." Whenever a composition, an element or a group of elements is preceded with the transitional phrase "comprising," it is understood that—unless the context plainly dictates otherwise—we also contemplate the same composition or group of elements with transitional phrases "consisting essentially of," "consisting of," "selected from the group of consisting of," or "is" preceding the recitation of the composition, element, or elements and vice versa.

We claim:

1. A composition comprising:
   a blend of 85 to 95 wt % of a first polymer fraction and 5 to 15 wt % of a second polymer fraction, said wt % s determined on the basis of total weight of the blend;
   wherein said first polymer fraction has Mooney viscosity of at least 50 MU (ML, 1+8@150° C.);
   wherein said second polymer fraction has Mooney viscosity that is at least 150 MU (ML, 1+8@150° C.) greater than the Mooney viscosity of the first polymer fraction;
   wherein each of the first and second polymer fractions independently comprises units derived from ethylene, one or more $C_3$-$C_{20}$ α-olefins, and, optionally, one or more non-conjugated polyenes; and further
   wherein the blend has one or more of the following properties:
   (i) Mooney viscosity within a range of 70 to 100 MU (ML, 1+8@150° C.);
   (ii) a Mooney relaxation area to Mooney viscosity ratio (MLRA/ML) measured at 150° C. within the range of 10 to 15;
   (iii) a molecular weight distribution (Mw(LS)/Mn(DRI)) within a range of 4 to 7; and
   (iv) a branching index (BI) of 6 to 10, measured by Rubber Process Analyzer at 150° C., 0.63 radian/second and 1000% oscillation amplitude.

2. The composition of claim 1, wherein the first polymer fraction has Mooney viscosity within a range of 60 to 75 MU (ML, 1+8@150° C.), and the second polymer fraction has Mooney viscosity within a range of 275 to 400 MU (ML, 1+8@150° C.).

3. The composition of claim 1, wherein the blend has all of the properties (i)-(iv).

4. The composition of claim 1, wherein the blend comprises 88.5 to 89.5 wt % of the first polymer fraction and 10.5 to 11.5 wt % of the second polymer fraction.

5. The composition of claim 1, wherein the Mooney viscosity of the blend is within a range of 77 to 87 MU (ML, 1+8@150° C.), and further wherein MLRA/ML at 150° C. of the blend is within a range of 10 to 12.

6. The composition of claim 1, wherein the ethylene content of the blend is within the range from 40 to 80 wt %, the α-olefin content of the blend is within a range from 5 to 60 wt %, and a non-conjugated polyene content is within a range from 0 to 15 wt %, where the wt % s are based upon a total weight of the blend.

7. The composition of claim 1, wherein the α-olefin is propylene, and the non-conjugated polyene, if present, is 5-ethylidene-2-norbornene (ENB).

8. The composition of claim 7, wherein the blend comprises 50 to 60 wt % ethylene-derived units, 5 to 8 wt % ENB-derived units, and a balance propylene-derived units, the wt % s on a basis of total weight of the blend.

9. The composition of claim 1, wherein the composition includes substantially no extender oil.

10. The composition of claim 1, wherein the blend is a reactor blend.

11. The composition of claim 10, wherein the reactor blend is formed by Ziegler-Natta polymerization.

12. The composition of claim 11, wherein the reactor blend is formed using a Ziegler-Natta catalyst system comprising a $VCl_4$ catalyst and an ethyl alumnium sesquichloride co-catalyst.

13. An at least partially cross-linked elastomeric compound made by mixing a formulation comprising:
(a) a multimodal elastomer composition according to claim 1;
(b) one or more vulcanization activators;
(c) one or more vulcanizing agents; and
(d) optionally, one or more further additives.

14. The compound of claim 13, wherein the compound further comprises a paraffinic process oil present in the formulation between 1 and 150 phr, said paraffinic process oil having a viscosity at 40° C. within a range from 80 to 600 CSt.

15. The compound of claim 13, wherein the compound comprises one or more further additives selected from the group consisting of a carbon black and a mineral filler.

16. The compound of claim 13, wherein the mixing comprises mixing in one of an open mill, an internal mixer, and an extruder.

17. The compound of claim 13, wherein the Mooney viscosity of the blend is within a range from 77 to 87 MU (ML, 1+8@150° C.), and the Mooney viscosity of the compound is within a range from 80 to 100 MU (ML 1+4 at 100° C.).

18. The compound of claim 17, wherein the Mooney viscosity of the compound is within a range from 85 to 95 MU (ML, 1+4@100° C.).

19. The compound of claim 13, wherein a ratio of compound Mooney viscosity (ML, 1+4@100° C.) to composition Mooney viscosity (ML, 1+8@150° C.) is between 1.0 and 1.1.

20. A method for making a reactor blend, the method comprising:
(a) feeding to a first polymerization reaction zone (i) a plurality of monomers comprising ethylene, one or more $C_3$-$C_{20}$ α-olefins, and, optionally, one or more non-conjugated polyenes, and (ii) a Ziegler-Natta catalyst system comprising a Ziegler-Natta catalyst and one or more co-catalysts;
(b) forming, in the first polymerization reaction zone, a first polymer reaction product having Mooney viscosity within a range of 65 to 74 MU (ML, 1+8@150° C.);
(c) withdrawing a first polymerization reaction effluent comprising at least a portion of the first polymer reaction product from the first polymerization reaction zone;
(d) providing to a second polymerization reaction zone at least a portion of the first polymerization reaction effluent, ethylene, one or more $C_3$-$C_{20}$ α-olefins, and, optionally, one or more polyenes;
(e) forming, in the second polymerization reaction zone, a second polymer reaction product having Mooney viscosity that is at least 150 MU (ML, 1+8@150° C.) greater than the Mooney viscosity of the first polymer reaction product; and
(f) withdrawing from the second polymerization reaction zone a second polymerization reaction effluent comprising the reactor blend;
wherein the reactor blend comprises an unreacted portion of the first polymer reaction product and the second polymer reaction product, and further has Mooney viscosity within a range from 77 to 87 MU (ML, 1+8@150° C.), and a molecular weight distribution (Mw(LS)/Mn(DRI)) within a range from 4 to 7.

21. The method of claim 20, wherein the reactor blend further has a Mooney relaxation area to Mooney viscosity ratio (MLRA/ML) within a range of 10 to 15 sec and branching index (BI) within a range from 6 to 10.

22. The method of claim 20, wherein the Ziegler-Natta catalyst system comprises a $VCl_4$ catalyst and an ethyl aluminum sesquichloride co-catalyst.

23. The method of claim 20, further comprising:
(g) providing the second polymerization reaction effluent to a devolatilization process without adding oil; and
(h) obtaining a devolatilized elastomer composition that is substantially free of extension oil.

24. The method of claim 20, wherein the reactor blend comprises 50 to 60 wt % ethylene-derived units, 5 to 8 wt % ENB-derived units, and a balance propylene-derived units, the wt % s on a basis of total weight of the reactor blend.

* * * * *